United States Patent [19]

Rihn

[11] 4,028,659

[45] June 7, 1977

[54] STRONG MOTION ACCELEROGRAPH WITH SELF-STARTER AND ELECTRICAL AS WELL AS LIGHT OUTPUTS

[75] Inventor: William J. Rihn, San Gabriel, Calif.

[73] Assignee: Kinemetrics, Inc., San Gabriel, Calif.

[22] Filed: July 5, 1974

[21] Appl. No.: 485,902

Related U.S. Application Data

[60] Division of Ser. No. 298,536, Oct. 18, 1072, Pat. No. 3,877,256, which is a continuation-in-part of Ser. No. 96,325, Dec. 9, 1970, abandoned.

[52] U.S. Cl. .................... 340/17 R; 340/15.5 TS; 340/261
[51] Int. Cl.² ......................................... G01V 1/18
[58] Field of Search ............... 340/15.5 R, 15.5 TS, 340/261, 15, 17

[56] References Cited

UNITED STATES PATENTS

| | | | |
|---|---|---|---|
| 2,736,012 | 2/1956 | Bland et al. | 340/261 |
| 2,799,015 | 7/1957 | Bell | 340/261 |
| 3,517,316 | 6/1970 | Anderson et al. | 340/261 |
| 3,552,520 | 1/1971 | Naubereit | 340/15 |
| 3,564,493 | 2/1971 | Hicklin | 340/15 |
| 3,613,093 | 10/1971 | Reynolds et al. | 340/261 |

OTHER PUBLICATIONS

"Small Earthquakes Observed with Local Seismometer Networks", Crampin et al, *Philosophical Transactions of the Royal Society of London*, Series A, vol. 274, no. 1239 (1973), pp. 383-387.

*Primary Examiner*—Howard A. Birmiel
*Attorney, Agent, or Firm*—William H. Pavitt, Jr.

[57] ABSTRACT

An accelerograph for recording strong earthquake motion in three mutually perpendicular directions is disclosed. An electromagnetic starter is provided for use particularly with the accelerograph to initiate recording and to continue recording for an adjustable period of time of from 6 to 15 seconds after the last shock. The starter may comprise a single magnetically activated element which is disposed to respond to the first and subsequent P-waves, or it may comprise three such elements, one vertically oriented to respond to movements in the Z-axis, and two horizontally oriented to respond to movements in the X and Y-axes. Such starters may also be employed to open or shut off switches for any type of equipment or apparatus which should or should not be operating during an earthquake or immediately thereafter. The accelerograph itself not only may produce recordings on light sensitive paper, but because of its utilization of electromagnetic elements which react to vibrations, it may also produce electrical outputs proportional to the intensities of the vibrations to which the accelerograph is subjected. These electrical outputs may be recorded on a magnetic tape or transmitted to a central earthquake intelligence center for direct recording, computerization or visual display at that location.

1 Claim, 19 Drawing Figures

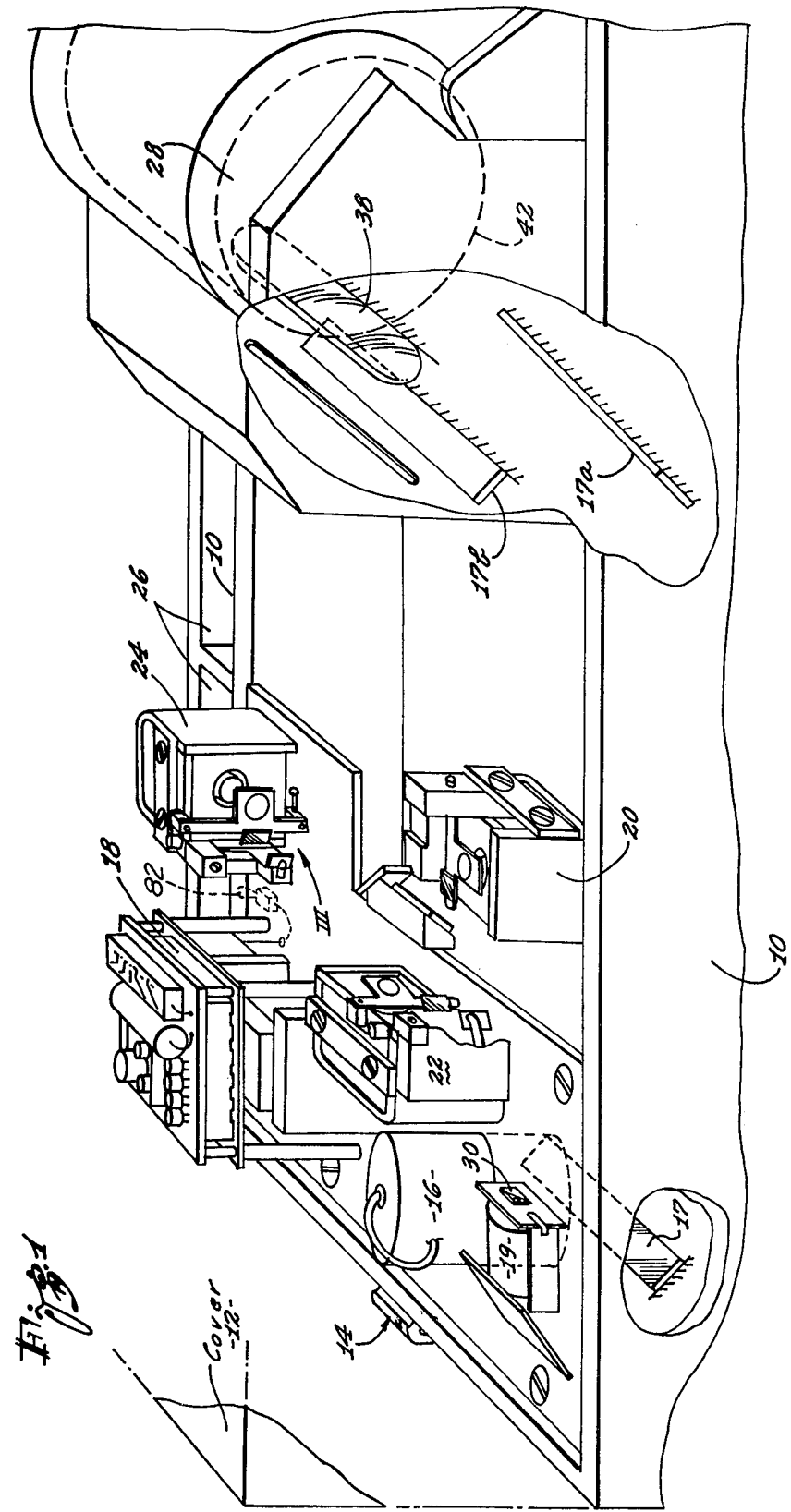

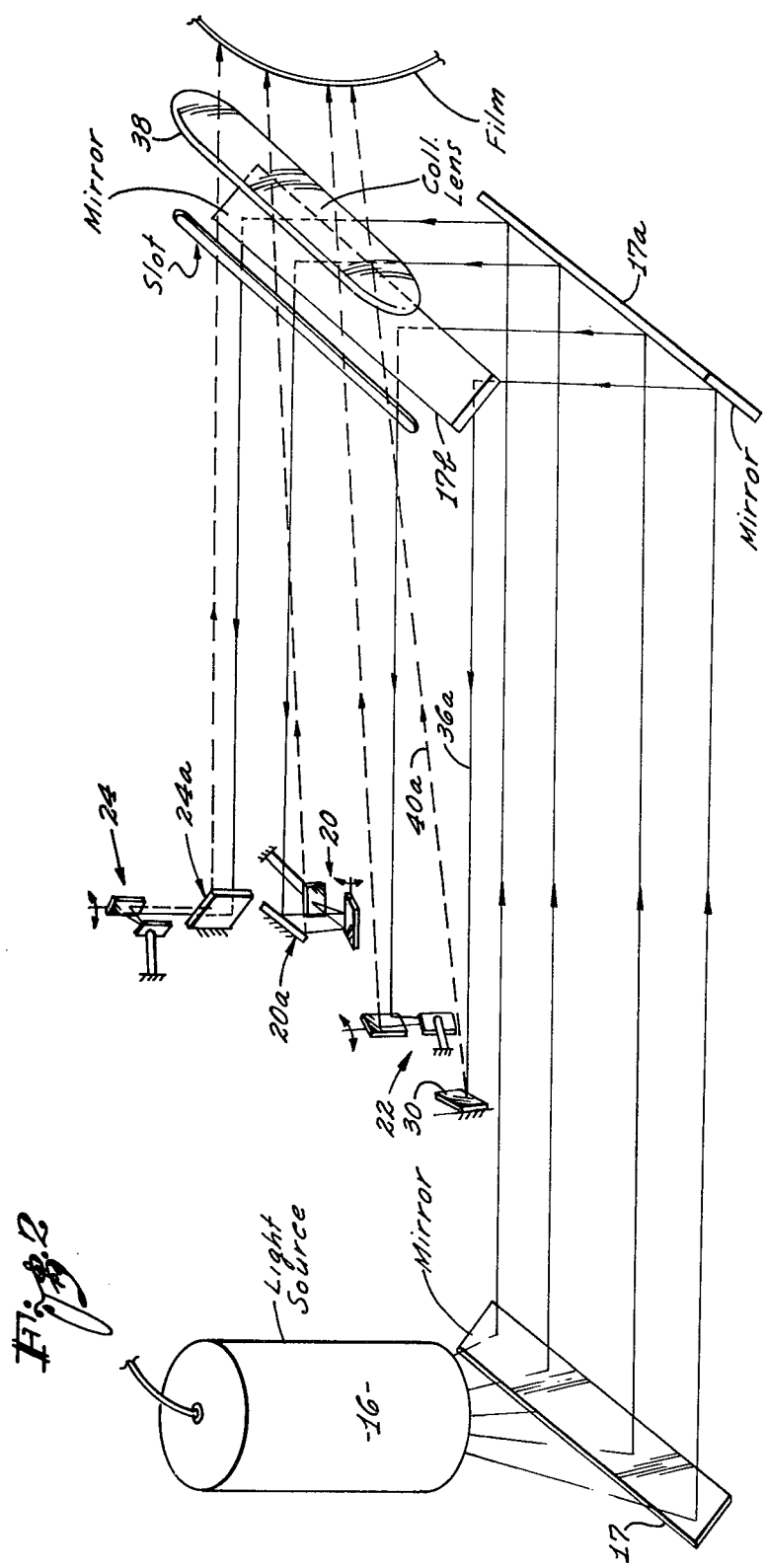

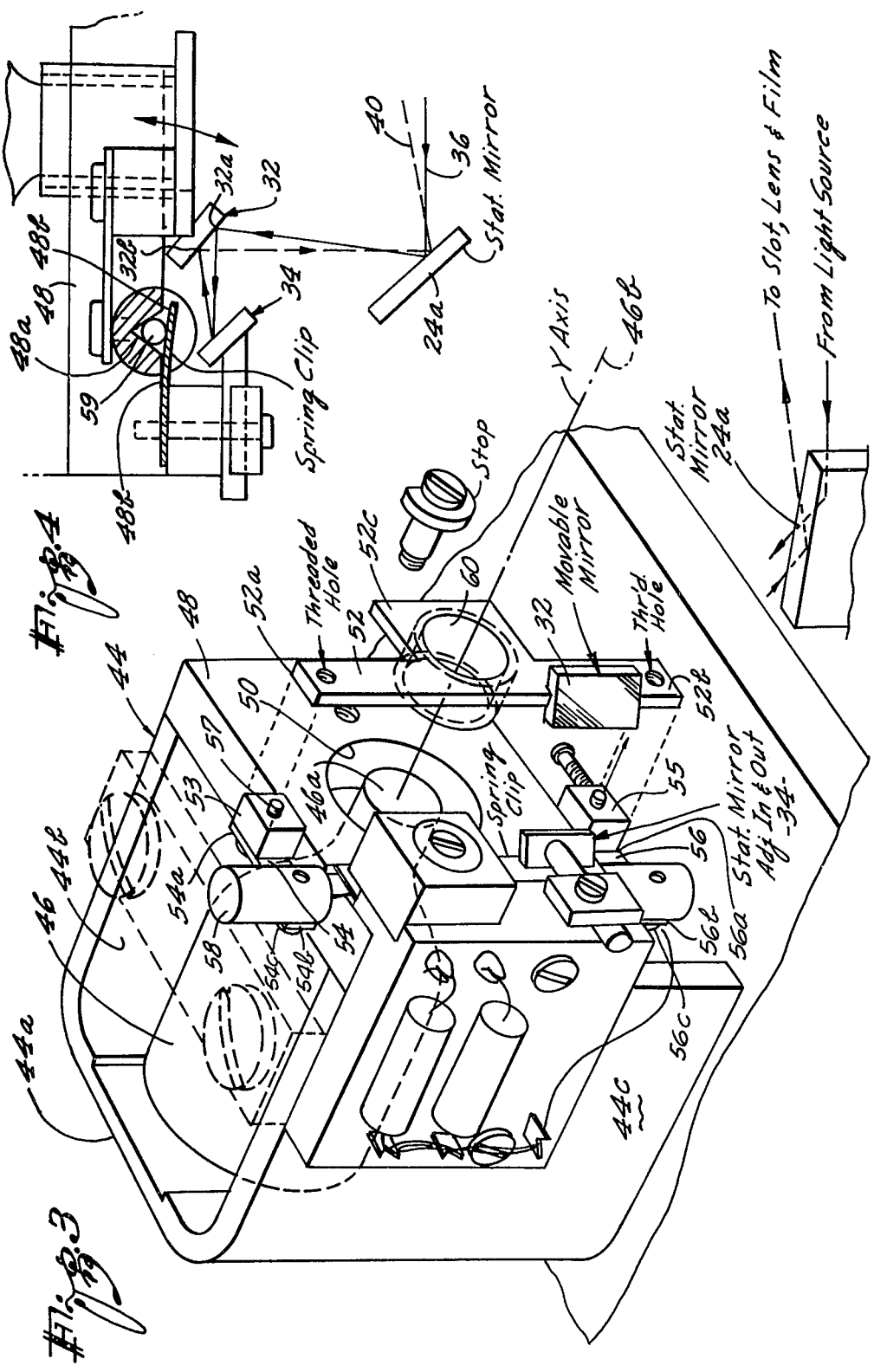

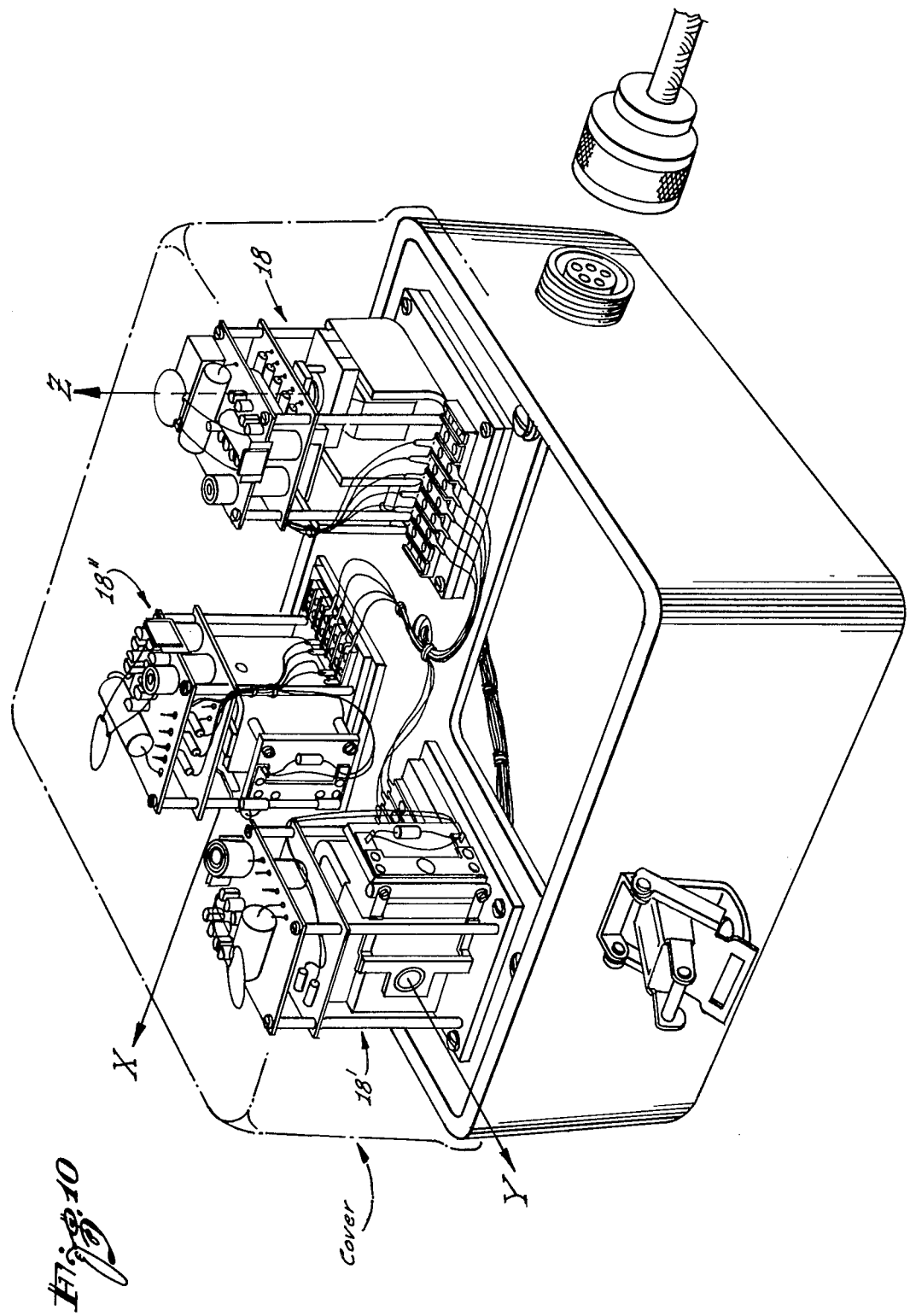

Fig. 13a (Alarm)
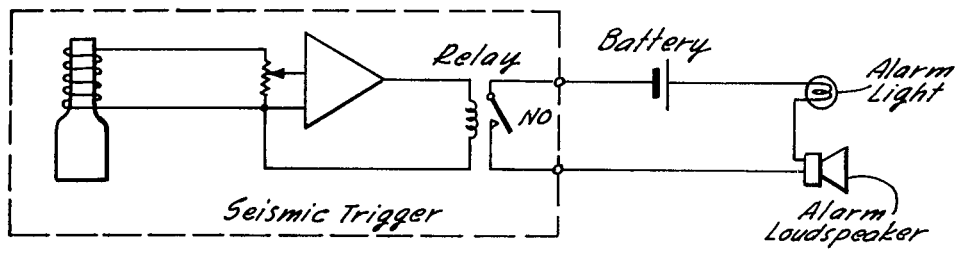
Fig. 13b (For Elevator Stoppage)
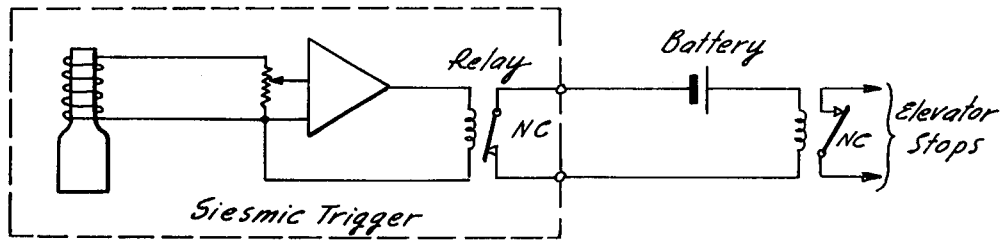
Fig. 13c (For Shutoff of Electricity & Gas Line)
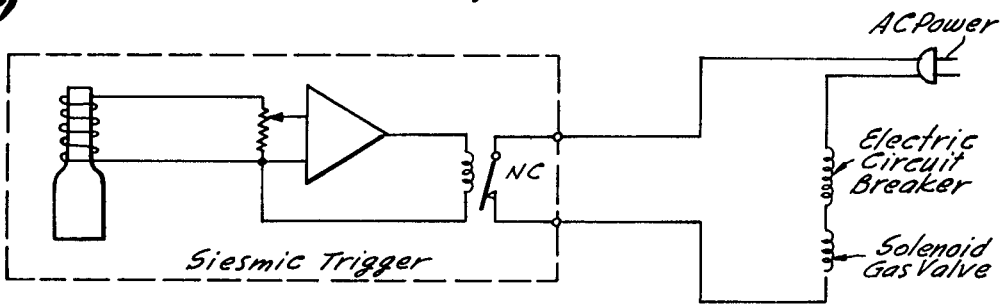
Fig. 13d (To Scram a Nuclear Reactor)
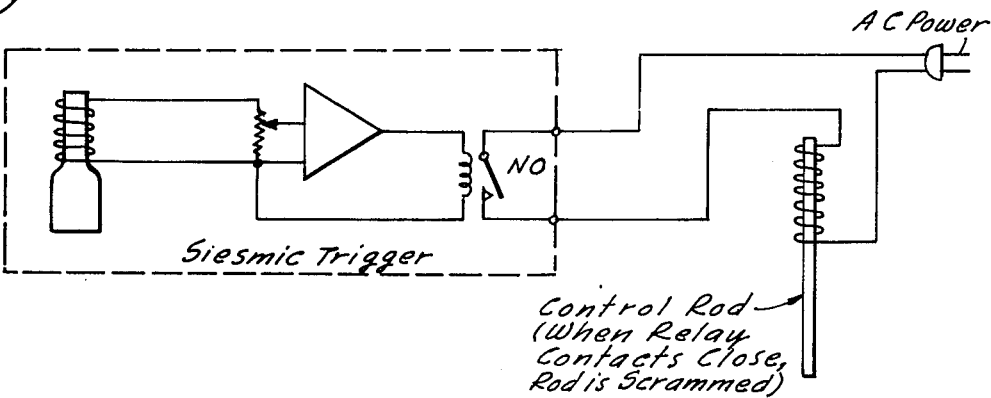

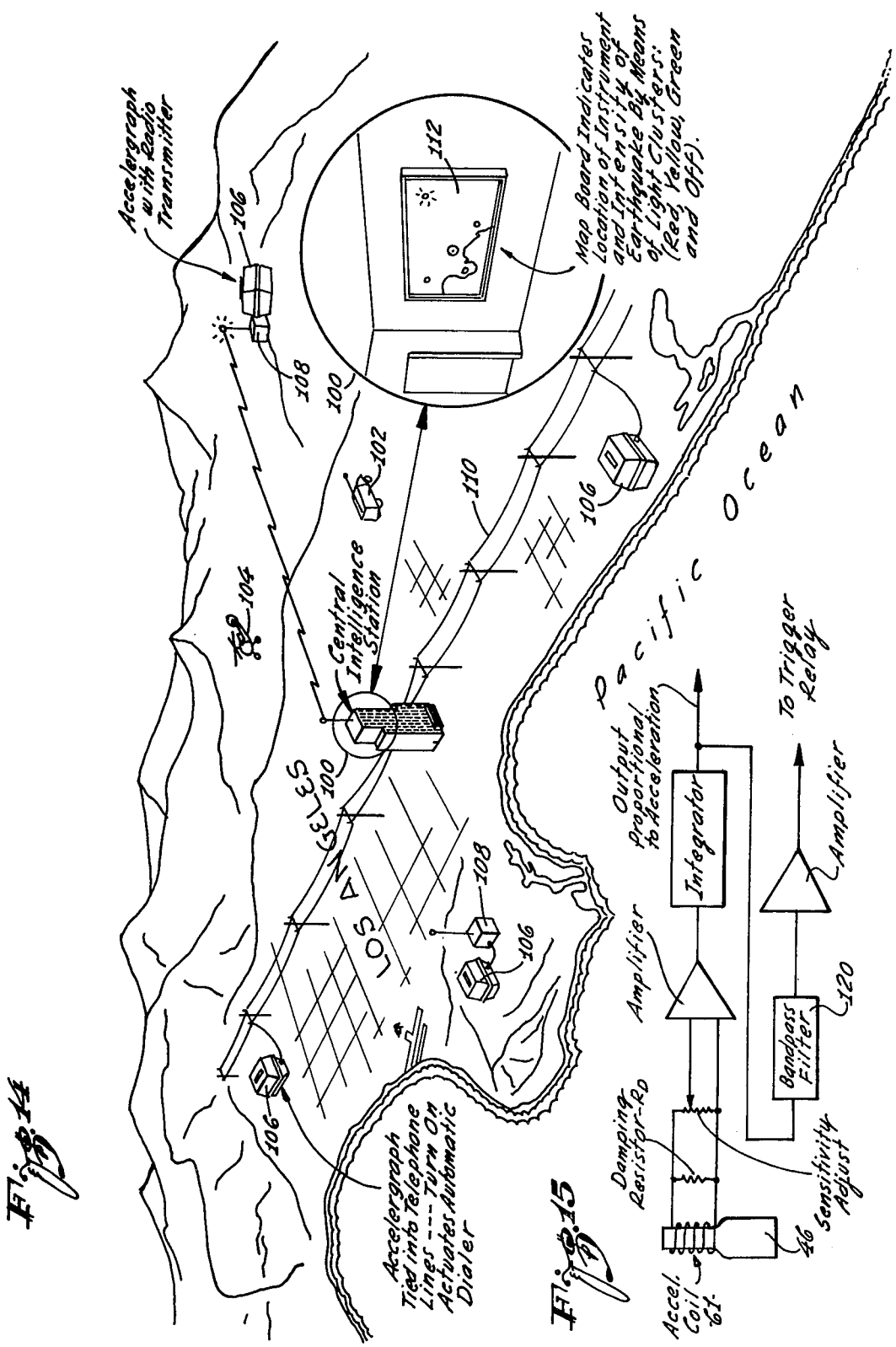

STRONG MOTION ACCELEROGRAPH WITH SELF-STARTER AND ELECTRICAL AS WELL AS LIGHT OUTPUTS

PRIOR RELATED APPLICATION

This is a divisional application of application Ser. No. 298,536, filed Oct. 18, 1972, now U.S. Pat. No. 3,877,256, which is a continuation-in-part of application Ser. No. 96,325, filed December 9, 1970, which application has been abandoned.

BACKGROUND OF THE INVENTION

1. Field of the Invention

This invention relates to accelerographs and particularly to those of the strong motion type which are employed to detect and record such movements of building structures as are caused by a range of earthquake shocks.

2. Description of the Prior Art

As set forth in an article entitled MODERN TRENDS IN STRONG MOVEMENT (Strong Motion) INSTRUMENTATION by H. T. Halverson, which appeared in PROCEEDINGS OF CONFERENCE ON DYNAMIC WAVES IN CIVIL ENGINEERING Swansea, Wales, 1970, John Wiley & Sons, the development of modern instrumentation for the detection and recording of strong local earthquakes commenced approximately in 1932, and has resulted in the design and availablility of a number of different types of devices based upon several different approaches to obtaining the desired measurements. These approaches have been in the form of (1) light reflection upon photoghaphic film; (2) magnetic tape; and (3) piezoelectric or piezo resistive devices. The present invention is directed to an improved accelerograph utilizing the first and second of the three listed approaches.

As also pointed out in the article referred to above, the need for improved accelerographs has become increasingly important since the building codes of certain major cities in the United States now require the installation of several of these devices in new building structures exceeding a certain number of floors.

While presently available accelerographs of the types described in the Halverson article have been reasonably effective in detecting and recording movements of certain intensities and direction, each has certain limitations. In particular, the light-reflecting types of accelerographs require the longest possible light paths in order to produce the most significant photographic shock pattern indications. However, where a small portable unit is to be constructed, in order to provide light paths as long as possible in a minimum amount of space, such paths must be folded a number of times. Efforts in this direction may be seen in the U.S. Patents issued to W. W. Miller (No. 2,670,660) and J. E. Jenkins (No. 2,917,918).

In addition, a problem with all types of accelerographs is providing an initiating switch which will activate the equipment instantly at the very first significant shock and keep it in operation for a long enough period to record such shocks and any further shocks which could reasonably be expected to follow it. Otherwise the equipment must be kept turned off so as not to waste power and the recording element, such as photographic film or magnetic tape. This requires a very fine control adjustment.

It has also been a problem, particularly with light-reflective accelerographs, to dampen the movement of the suspended mirrors once such movements have been initiated by any shock wave. Unless effective damping is accomplished, the indications of subsequent, closely following, smaller shock waves might be difficult to distinguish among the diminishing oscillations engendered by a preceding high intensity shock. Moreover, spurious undampened resonances may adversely affect trace width. Viscous dampening, however, presents certain difficult container and movement problems. While U.S. Pat. No. 3,333,460 issued to N. P. Reeff has suggested the use of electromagnetic damping, the mass-optical element and coil arrangement suggested by this patent, does not readily lend itself to utilization in small portable tri-axial accelerographs.

Any accelerograph should also be entirely self-contained and capable of withstanding very destructive forces. Thus, if it is light-reflecting, it should provide its own light source. In any event, it should be so encased that it can withstand the forces which might be exerted upon it by the collapse of the building in which the accelerograph is installed as well as resist any encroachment by water which might result from the rupture of pipes during an earthquake.

One of the great needs in an earthquake detection and damage control is to be able to utilize immediately the detection of initial earthquake generated seismic waves to effect immediate shut-off or control or certain types of equipment and apparatus (such as gas or gasoline lines and pumps, nuclear reactors, etc.) in order to prevent damage thereto or to the surrounding area. Such damage might occur were such equipment or apparatus to continue to operate during earth tremors or thereafter when the equipment or apparatus may have been damaged through quake activity.

There has been offered both in Japan and the United States by the Toyo Automation Company of Tokyo, Japan, a unit called VIBCOCK V-711 which includes a shock sensing element suspended by a ferrite magnet. When dropped by an earthquake, a stopper is moved to close a valve thereby shutting off a flow of gas. However, this is a very special unit which is not intended for use as a part of an accelerograph, or accelerograph system.

In earthquake disaster operations in municipalities it is sometimes difficult for those charged with setting up rescue and damage control activities to know where the greatest damage has occurred so that emergency equipment and personnel can be most effectively dispatched to such locations. Heretofore, the only way in which the desired damage intelligence has been collated is by telephone calls or two-way radio communication with the badly affected areas. However, where damage is great and telephone service has been interrupted, such information may be slow in getting out of such areas. An example of this was the Feb. 9, 1971 earthquake in the Los Angeles, California, area. Accelerographs heretofore devised may be suitable for recording what happened in the areas where they were located, but such historical information provides no assistance at the time the quake is occurring or immediately thereafter when emergency assistance is needed for the affected areas.

SUMMARY OF THE INVENTION

One feature of the present invention is to utilize three flexure type accelerometers in a tri-axial configuration (X, Y and Z) with a special arrangement of the mirrors, including in each light path an additional mirror to provide folded optic paths of extended distance.

The recording or transmitting portion of apparatus of the invention is designed to provide a total of at least four traces: three active acceleration traces (one for each axis) and one or more combination timing/reference traces. The timing trace may be programmed for two marks per second.

Each displaceable mirror is included as part of the transducer mass, which is also comprised of a coil of wire and an elongated plastic plate which supports the coil. The plate itself is cantilevered by two flexible flat spring-like elements over the end of a permanent magnet so that the coil, when jarred, oscillates within a magnetic field. By having its ends connected across an electrical resistance element; there may be provided electromagnetic dampening of the transducer mass equivalent to viscous dampening.

However, the electrical output pattern produced by the oscillation of the coil in the axis of the magnetic field may itself be utilized either to provide an electrical trace recording on a magnetic tape concurrently with the optical recording, or it may be transmitted either by phone line or radio to a computer or earthquake intelligence center for plotting or display on a cathode ray tube showing all or a portion of a municipality or other monitored area. The present invention also comprehends such an earthquake intelligence system.

Initiation of recording or transmission is effected by a new type of acceleration-sensitive seismic trigger. For fastest response, this trigger may be oriented vertically in order that it may be actuated by the P wave ground motion. Upon triggering, through solid state circuitry, recording or transmission continues for an adjustable minimum operating time of between 6 and 15 seconds. This triggering arrangement is adjustable to respond to an actuating level of from 0.005 g to 0.05 g where an 0.01 g is considered average. Damping is 1.5 times critical with a flat response to acceleration from 1 to 10 Hz.

However, a similar trigger could be set up to respond to horizontally directed motions, or preferably in conjunction with a vertical trigger, so that a response may be induced by an acceleration occurring in any of the three X, Y and Z axes.

It is also a feature of the present invention to utilize one or more of such seismic triggers directly to initiate some other action besides recording by accelerometer. Thus, the signal generated by a seismic trigger may be fed into a circuit to produce a response in the form of operating a switch to shut off some apparatus, such as a gas or gasoline pump or a nuclear reactor, or to operate valves to close gas or fuel lines so that highly inflammable fluids would no longer flow through such lines in an area damaged by an earthquake, until manually re-set.

Each accelerograph unit may be mounted on a heavy cast aluminum base with ribs to minimize low frequency resonance. It may also be provided with an external connector for ganged starting and timing of an accelerograph network. To enable the unit to be incorporated in a network, there may also be included in the camera module a slave-master timing switch. Each accelerograph unit is also battery powered.

BRIEF DESCRIPTION OF THE DRAWINGS

In the accompanying drawings:

FIG. 1 is a perspective view of the preferred embodiment of the apparatus with its cover removed;

FIG. 2 is a schematic view of the light beam paths followed through each of the three accelerometers of the FIG. 1 embodiment;

FIG. 3 is an enlarged perspective and partially exploded view of the transducer unit to which the arrow III points in FIG. 1;

FIG. 4 is a schematic plan of a particular light path followed in one of the accelerometers of the transducer unit of FIG. 3;

FIG. 10 is a perspective view of a unit having seismic triggers responsive to accelerations in each of the three X, Y and Z axes, the electrical outputs of which may be utilized for any of a number of purposes;

FIGS. 13 a-d are schematic diagrams of circuits showing several arrangements whereby the output of a seismic trigger may be utilized to operate an alarm or to shut down operating apparatus;

FIG. 14 is a schematic diagram showing an array of accelerographs disposed in a given geographical area with their outputs transmitted to a central intelligence station;

FIG. 15 is a schematic of a circuit for utilizing a single magnet-coil for both starting vibration processing and to provide the electrical signals to be processed.

DESCRIPTION OF THE PREFERRED EMBODIMENT

Figure 5:
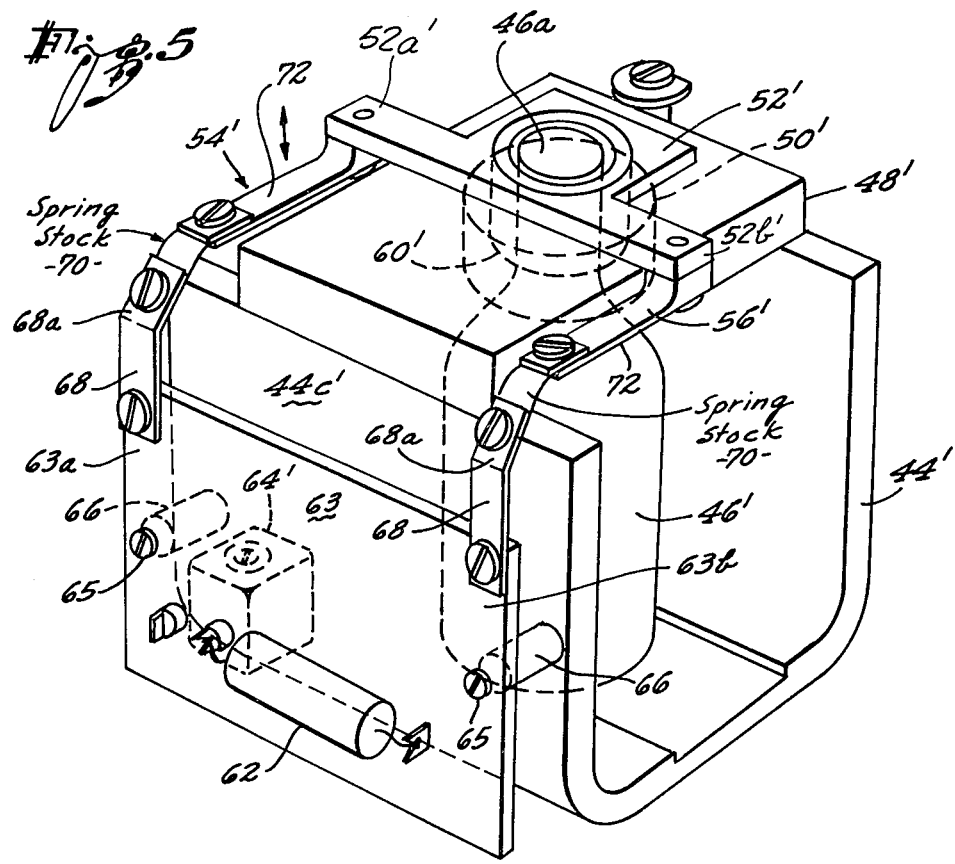
FIG. 5 is an enlarged perspective view of the seismic trigger transducer unit.

Referring to FIG. 1, the accelerograph is laid out in a lower half 10 of the cast metal housing comprising such lower half and a close fitting cover 12, both parts of which housing may be secured together by laterally disposed locking elements 14. Within the lower half 10 are mounted the following major components: a light source 16 and three common elongated mirrors 17, 17a and 17b, a seismic trigger unit 18, a reference tracing timer 19, three accelerometers 20, 22 and 24, a battery pack 26 and a photographic module 28. Each of these components and their operations and interaction with each other will hereafter be described.

The overall optical arrangement may be best seen in FIG. 2. Light from the source 16 is directed widely and downwardly onto the face of the elongated slanted mirror 17 where it is reflected to the face of the second elongated slanted mirror 17a, and from there, it is further reflected upwardly to the face of the third slanted mirror 17b. The latter mirror still further reflects the broad light beam received by it back toward the two stationary mirrors 20a and 24a, associated with the vertical and transverse accelerometers. These two mirrors 20a and 24a each deflect a portion of the light by 90°, pointing light directly into the two aforementioned accelerometers. No such deflection is necessary for the longitudinal accelerometer. The net result is that there are three othogonal beams of light each pointing (or aimed) directly into one of the three accelerometers. Since the optical paths in each of the accelerometers is identical except for its axial orientation, it is sufficient to describe the mirror arrangement in only one of these three accelerometers, and for this purpose that of accelerometer 24 has been selected. This is shown in FIG. 4 and comprises the first stationary mirror 24a, a second and displaceable mirror 32, and a third mirror 34, which is also stationary.

In this arrangement it may be seen that the light beam 36 which arrives from the mirror 17b is first reflected to one side 32a of the small movable mirror 32 from which it is first reflected to the face of the small stationary mirror 34, located relatively close to the movable mirror. The small stationary mirror 34 is so disposed that it reflects the beam received from the one side 32a of the movable mirror 32 back to its other side 32b, from which it, in turn, is reflected back to the first stationary mirror 24a and thence on to lens 38 of the photographic module 28. It will be appreciated that by this arrangement, any movement of the mirror 32 produces a double angular effect upon beam 40 which thus is reflected on to the lens 38.

The doubling of the angular effect of movement of the mirror 32, may be utilized to achieve higher sensitivity, increased natural frequency, reduced distance to the film plane, or a combination of these possible achievements. In a portable unit, such as that herein illustrated and described, the ability to reduce the distance to the film plane without reducing sensitivity is of particular importance.

The lens 38 serves to collimate the light reflected onto it by the mirror 24a and to focus it upon the roll 42 of photographic film which is moved across the path of the thus focused light beam in the conventional manner of prior art accelerographs of the light-reflective type.

Movement of the mirror 32 (and of its counterparts in the other accelerometers 20 and 22), in response to shock waves or vibrations arriving at the accelerometer along the particular axis to which the accelerometer is oriented, may best be understood by considering FIG. 3 which details accelerometer 24 aligned to pick up vibrations arriving along the Y-axis.

The accelerometer 24 is mounted by means of, and is partially housed within a metallic channel member 44 which is secured to the floor 10a of the lower half 10 of the housing. A cylindrical bottle-shaped permanent magnet 46 is fixedly mounted to the inside of the base 44a of the channel member 44 to project toward the opening between the walls 44b and 44c. The outer ends of the latter walls are bridged by thick metal plate 48 which is centrally orificed at 50 to permit the small end of 46a of the magnet to extend therethrough with good annular clearance, means are provided properly to mount the small stationary mirror 34 to accomplish the reflection of the light beam back to the movable mirror 32, as described in connection FIG. 4. The movable mirror 32 is mounted angularly on an elongated element 52 which is secured at both of its ends 52a, 52b to the free ends 54a, 56a of cantilevering spring-like elements 54, 56 respectively by blocks, 53, 55, and screws 57. The outer ends 54b, 56b of these elements are fixedly secured by screws 54c, 56c to the cylindrical heads 58 on opposite ends of a post 59 which is disposed in an angular groove 48a in the plate 48 and is held in said groove by at least one, and preferably two, flat spring retainers 48b. As so retained, the post 59 may be rotated against the pressure of the spring retainers 48b to permit the angular disposition of the element 52 to be varied.

The elongated element 52 includes a lateral rectangular tab-like extension 52c on the underside of which may be mounted the one end of a cylindrical coil of wire 60. The element 52 with its tab-like extension 52c and coil 60 are normally so placed that the coil 60 is disposed around, but not in contact with, the small end 46a of the permanent magnet 46, and extends into the orifice 50 without touching the walls 50 in the plate 48 which define said orifice and provide the good clearance around the small end 46a of the magnet 46. Since the post 59 may be turned against the pressure of the spring retainers 48b, one may, by such turning, adjust the disposition of the coil 60 and mirror 32.

The angular sensitivity of the accelerometer is determined by the torque of the coil about the flexure springs and the resistance of the flexures to the applied moment. The relationship of these parameters may be expressed by the equation: $\theta = T/K$ where $\theta$ is an angular sensitivity, $T$ is the applied torque, and $K$ is the spring constant of the flexures. The applied torque is approximately: $T = m\ a\ v$ where $m$ equals the mass of the coil, $a$, the applied acceleration, and $v$, the distance from the center of the coil to the center of flexure. The natural frequency is determined by the inertia of the coil with respect to its axis of rotation and the spring constant of the flexures. Thus: $W_n^2 = K/I$ where $I$ equals the inertia of the coil, given approximately by the formula $I = m\ a\ v^2$. Since it is extremely desirable to have both a high sensitivity and a high natural frequency, the flexure point preferably coincides with the edge of the coil 60, and the latter should have a reasonably small diameter. In this way the sensitivity will be maximized with the natural frequency product being determined as follows: $0. W_n = (T/K)\ .\ (K/I) = 1/v$.

It is also desirable to minimize the sensitivity of the accelerometer to accelerations along the cross axis. This is accomplished by aligning the center of gravity of the mass with the flexures in the cross axis direction by means of the blocks 53, 55 interposed between the ends 52a, 52b of the element 52 and the ends 54a, 56a of the spring-like elements 54, 56 respectively. It will be seen that by this arrangement any rotation of the coil 60 by cross-axis acceleration is minimized.

Since the post 59 may be turned against the pressure of the spring retainers 48b, one may, by such turning, adjust the positioning of the flexure elements 54, 56 and the disposition of the coil 60 and mirror 32.

This arrangement thus effectively provides a transducer mass comprised of the element 52, the coil 60, and mirror 32, which mass is resiliently cantilevered from the vertical post 59. Therefore, any jarring in the Y-axis 46b of the post 59, which is attached to the U-shaped channel member 44 through the plate 48, which member is itself secured to the bottom half 10 of the accelerograph housing, will produce an oscillation of the said transducer mass with the twofold effect causing (a) the mirror 32 to wobbulate and thereby produce a record of the wobbulations on the photographic film 42 through the deflections of the light beam 40; an (b) the coil 60 to oscillate axially of the permanent magnet 46 and in its field, thereby inducing a flow of alternating current in the coil. The nominal natural frequency of such transducer mass will be found to be 25 hz. The distance of the folded optical path from the light source to the accelerometer desirably may be approximately 39 cm. Recording is preferably effected on a 70 mm photographic film whose speed is 10 mm/sec.

Figure 6:
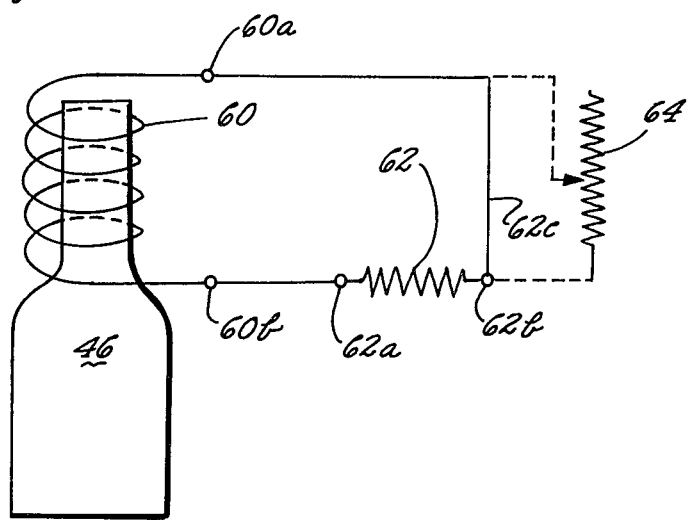
FIGS. 6 and 6a are schematic diagrams of a simple damping circuit for an accelerometer.

The alternating current which is thus induced in the coil may be utilized to damp the oscillation of the coil electrically by connecting the extremities 60a, 60b, of the coil 60 to the opposite terminals 62a, 62b of the damping resistor 62, as shown in the diagram of FIG. 6. The valve of the resistor 62 may be preselected and fixed (preferably of the order of 20 ohms with a typical coil resistance of 26 ohms). By including the variable resistor 64, battery 26a, and switches S1 and S2 in such a circuit, as shown in FIG. 6, a checking and calibration of the accelerometer may be accomplished. For normal operation, the switch S2 is closed and switch S1 is left open. Thereby the damping resistor 62 is connected across the coil, providing damping when the mass oscillates due to any applied acceleration. However, when it is desired to calibrate the accelerometer, the switch S1 is closed to apply a current through the coil, which current is determined by the voltage provided by the battery 26a and the value of the variable resistor 64. The current reacts with the magnetic field to create a force on the mass. Observation of the displacement caused by such force enables one to determine the extent of damping. Switch S2 is then opened and this stops the current through the coil 60 and also eliminates all damping so that the mass will freely oscillate at its natural frequency which may then be determined.

Figure 7:
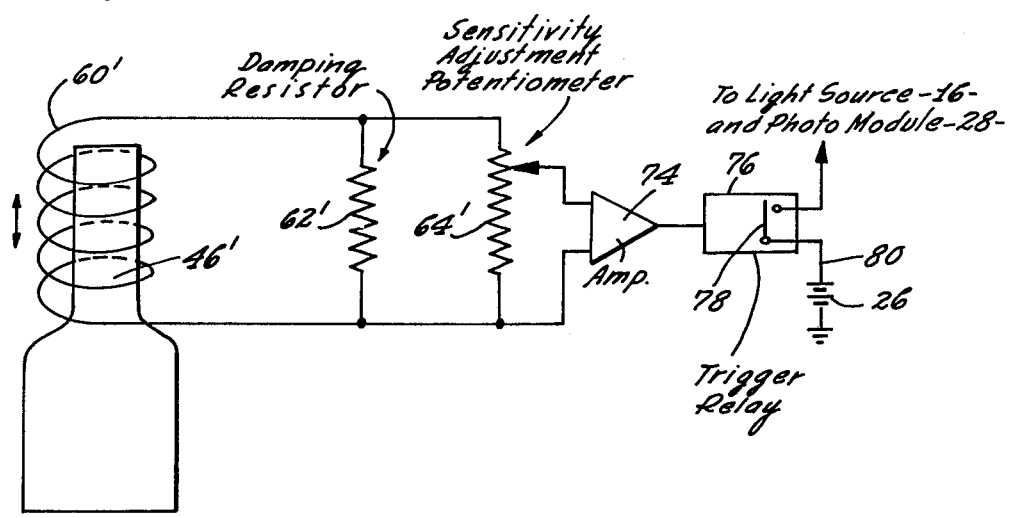
FIG. 7 is a schematic circuit diagram of the triggering system.
Figure 8:
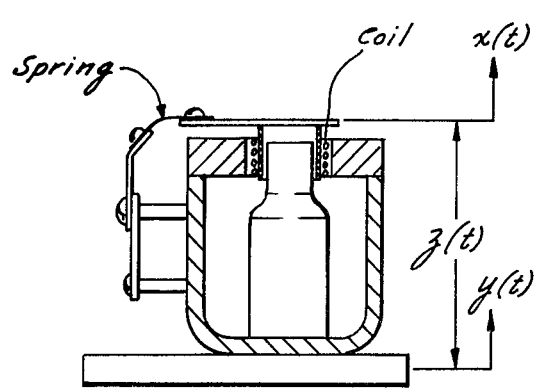
FIG. 8 is a sectional view of the transducer unit for the triggering system.

FIG. 8 illustrates the preferred embodiment of the starter which may be employed with the circuitry in FIG. 7, to constitute the seismic trigger 18. It, of course, is appreciated by persons involved with accelerographs that these devices cannot practically be continuously maintained in operation for any extensive period of time just awaiting the fortuitous arrival of some shock to be recorded. Were they so continuously maintained in operation, their batteries would run down and an enormous amount of film might be used up without there having been recorded any useful data. On the other hand, if the devices are triggered only by the arrival of a large shock wave, there may be no record of significant initial shock waves which may precede the triggering by the large shock wave. Since an examination of strong motion earthquake accelerograms from past earthquakes shows that in practically all cases the vertical ground acceleration has attained relatively large values at the time a horizontally actuated starter has triggered the instrument, one may logically conclude that vertically arriving motions corresponding to the higher velocity P-waves will arrive ahead of the horizontal motions associated with the S-wave. It is in view of this observation and deduction that the present invention provides for the use of a vertical starter rather than a horizontal one.

As may be seen in FIGS. 5, 8 and 10, the seismic trigger employs a transducer unit which, in some respects, is similar to each of the units included as parts of the accelerometers 20, 22, and 24. Thus, FIG. 5 shows a similar channel member 44', the ends of which are bridged by a plate 48' having an orifice 50' through which projects the small end 46a' of a permanent magnet 46'. About this small end 46a' of the magnet is suspended a coil 60' which is supported by an elongated element 52' cantilevered by spring elements 54' and 56'. However, this transducer unit structure differs from that of each of the accelerometers 20, 22, and 24 in omitting the mirrors 32, 34, and 20a and 24a, and in the manner in which the elongated element 52' is resiliently cantilevered from the fixed members such as the channel member 44. Since the only purpose of the seismic trigger 18 is to trigger the delivery of electrical power from the battery pack 26 to the light source and to the photographic module, and thereby place the accelerograph in operation, the mirrors of the other accelerometers are totally unnecessary and would perform no useful function.

With respect to the cantilevering of the element 52', this is accomplished by attaching a plate 63 in parallel spaced relationship to one of the side walls 44c' by means of screws 65 and spacers 66. Clips 68 with slightly bent and drilled ends 68a are secured at the two upper corners 63a and 63b of the plate 63. These drilled ends 68a are screwed onto or otherwise secured to one end of each of two curved pieces of spring stock, which at the cantilevering spring-like elements 54' and 56', the other end of which is similarly attached to one end of one of two straight elements 72. The other ends of these elements 72 are secured to opposite ends 52a' and 52b' of the elongated element 52'. Thereby the transducer mass, comprising the elongated element 52', and its coil 60', are resiliently cantilevered so that the coil may oscillate in the vertical Z-axis in which the magnet 46' is coaxially disposed. In this orientation the coil 60' and permanent magnet 46' will be set in motion relative to each other with the first P-wave of a predetermined magnitude, thereby generating a flow of current in the coil 60'. This current flow may be utilized to trigger operation of the accelerograph.

As shown in FIG. 7, the coil 60' is connected to a circuit comprising a damping resistor 62', a variable resistance potentiometer 64', an amplifier 74 and a trigger relay 76 which, when actuated by a signal of sufficient value from the amplifier 74, serves to close the switch 78 to connect the line 80 from the battery pack 26 to both the light source 16 and photographic module 28. Such closing of the switch 78 thus effectively initiates operation of the accelerograph so that recording is immediately commenced. However, the switch 78 is maintained in closed position only so long as there is sufficient flow of current in the coil 60' to enable the amplifier 74 to produce an adequate signal for delivery to the trigger relay 76 plus an additional 6–15 seconds. Where the mechanical oscillation of the coil 60', within the field of the magnet 46' not damped, some current of ever decreasing amperage might continue to flow in the coil 60' for as long as several minutes after the last significant acceleration resulting from earth motion. It is in order to cut off such a prolonged de minimis current flow that electrical damping effected by resistor 62' is provided. However, it is desirable to continue recording for somewhere between 6 to 15 seconds after the last P-wave—a period which may not be possible with such electrical damping. Therefore, an electrical time hold-on circuit (not shown) may desirably be included in the circuit of the trigger relay circuit 76 to hold the switch 78 closed for the additional 6 to 15 second period following the occurrence of the last P-wave acceleration.

In order to provide a time reference for the light beam wobbulations which will be traced as 79, 79a, 79b (FIG. 9) on the photograph film 42 by the three accelerometers 20, 22, and 24 respectively, an independent parallel time trace 79c should be provided. In the disclosed embodiment, a separate light beam 36a is directed from the mirror 17b to the mirror 30 which is mounted on the movable member 88 of the timer solenoid 19. The beam 36a is normally reflected as beam 40a to the film 42 to provide a line 79c parallel to the traces 79, 79a and 79b arriving from the three accelerometers. An electrical current (not shown) triggers the timer solenoid 19, for example, twice each second to cause a slight deflection of the mirror 30, thereby producing pips or dips 79d in the line 79c each of which indicates the passage of one-half a second of time, as a reference for the traces 79, 79a and 79b produced by the three accelerometers.

In most instances a seismic trigger of the type illustrated in FIGS. 5, 7 and 8 and described herein above, when oriented in the Z-axis should react to the first detectable earth movement which precedes the onset of an earthquake. However, from an insurance standpoint, it may be desirable to provide two additional triggers 18', 18", one oriented in the X-axis and another in the Y-axis, as may be seen in FIG. 10. With such a tri-axial array of seismic triggers, a triggering electrical output can be generated by even the slightest earth movement. Such a tri-axial array of seismic triggers 18, 18' and 18" might have particular utility where their outputs may be utilized to initiate some action other than merely starting an accelerograph as in the embodiment of the invention illustrated in FIGS. 1–8.

It is thus contemplated that, as illustrated in FIGS. 13a, 13b, 13c, and 13d, the output of a seismic trigger, either such as 18 constituting a part of an accelerograph as in FIG. 1, or set up as a separate unit (FIG. 10) with proper amplification, may be utilized to sound an alarm (FIG. 13a), stop further operation of an elevator at the nearest floor (FIG. 13b), shut off gas or other fuel lines or electrical power (FIG. 13c), or scram a nuclear reactor (FIG. 13d). In any such application, once the triggering has occurred to effect such action or shut-off, the affected apparatus should normally remain in such condition until manually re-set by an operator—irrespective of whether the trigger shall cease delivering any electrical output.

Figure 12:
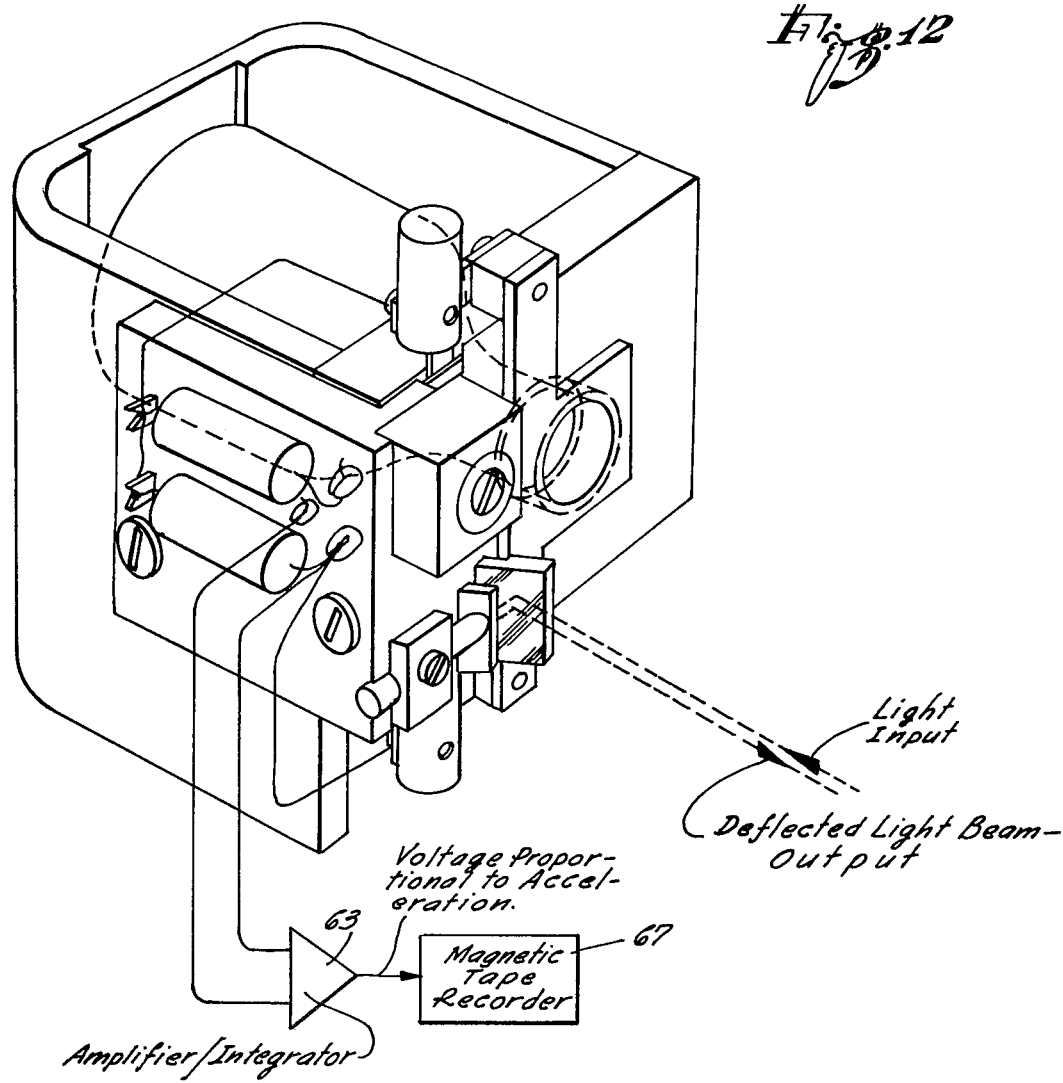
FIG. 12 is a perspective view with schematic connections of an accelerometer unit for producing simultaneous optical and magnetic tape recordings.
Figure 11:
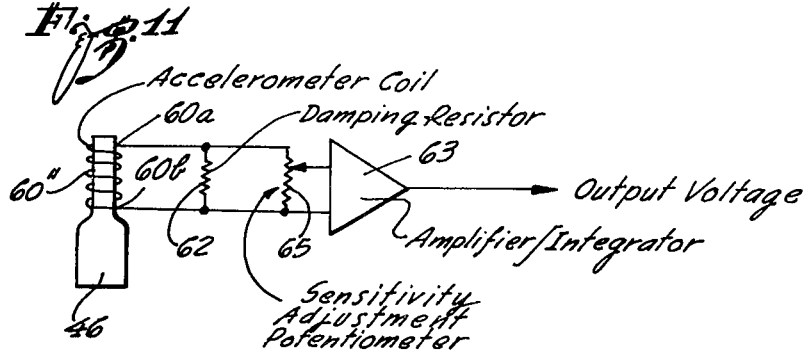
FIG. 11 is a schematic diagram of a circuit whereby the movement of the accelerometer coil may be utilized to produce intelligence in the form of voltage variations.

It is further contemplated that, as illustrated in FIGS. 11 and 12, the voltage variations of electrical outputs generated by the movements of the coils 60" within the magnetic field of the accelerometer, may themselves be recorded on magnetic tapes or utilized to operate a stylus on a moving graph to provide significant intelligence concerning the course of an earthquake. Such charted voltage variations may then be compared with the graphic recordings optically produced by the accelerograph of FIGS. 1 and 2 on its moving film, as illustrated in FIG. 12. For this purpose the terminal 60a and 60b of the coil 60" are connected to the input side of an amplifier integrator 63 in parallel with resistor 62 and through potentiometer 65. The output of coil 60", as thus amplified and integrated, then passes to the magnetic tape recorder 67.

However, aside from the general scientific desirability of securing comparable intelligence in an accelerograph by recording the voltage variations on a magnetic tape, such voltage variations may be further employed importantly in another manner as illustrated in FIG. 14. In a city, such as Los Angeles or San Francisco, where earthquakes periodically occur, it is desirable to maintain in some suitable location, a central intelligence center or station 100 from which damage control operations may be directed and relief vehicles 102 and aircraft 104 may be dispatched.

In such a system, a plurality of accelerographs or simple voltage variation generating units 106 may be disposed within the geographic area to be monitored, about the central intelligence station 100. Each unit 106 may be provided with a radio transmitter 108 operating on a preselected frequency and into which the electrical output of one or more coils 60", after amplification and integration, may be fed for transmission. Each transmitter 108 is beamed toward the station 100 and desirably transmits simultaneously on at least three different frequencies--one for the electrical output of each accelerometer 20, 22 and 24 (FIG. 1). When a quake hits the city, the seismic trigger 18 may initiate operation not only of the accelerograph, as described hereinabove in relation to FIGS. 1 through 8 inclusive, but also of the transmitter 108 in a manner similar to what has been described in connection with FIGS. 13a – 13d inclusive.

While it would, of course, be possible to power each accelerograph unit 106 from available electrical current and, through an automatic dialer (not shown), cause the electrical output of the accelerograph coil or coils 60" to be transmitted to the central intelligence station or center 100 via the telephone system 110, there should at least be a back-up power system (e.g. a battery, not shown) and radio transmission (battery powered) in the eventuality that the quake is of such magnitude as to knock out of operation either or both the city electrical power system and telephone lines 110. Also, since even automatic dialing may lose precious seconds of quake intelligence, direct radio transmission of intelligence to the station 100 is to be preferred.

In any event, the central intelligence station or center should be provided for each frequency of each transmitting accelerograph-transmitter 106, 108 which is beamed toward it, with a receiver (not shown) and some means for recording and plotting on a map 112 the respective intensities of the voltage variations received as transmissions from the transmitting accelerographs 106, 108. Such plotting could either be accomplished manually by an operator interpreting the recordings of the incoming signals, or the latter could be flashed instantly on a cathode ray tube type of map (not shown) where an observer could ascertain visually from the signal intensities over what areas the quake vibrations appear to be the greatest. Preliminary damage estimates could be than made and available emergency equipment and personnel immediately dispatched into that area or those areas from which the greatest signal intensities were received. The manner of use of a cathode ray tube type of map is well known, having been employed, for example, by the military for surveillance of ships and planes throughout a geographic area. For utilization of this well understood art in an earthquake central intelligence station, the CRT would be preprogrammed with a set of maps. One such map would show the entire geographic area of interest. Other maps would show subregions in progressively more details. When an earthquake occurs, the intensity information from each accelerograph would be superimposed on the map display. The operator could select whichever map (or maps) portray the areas in which the earthquake intensities are greatest.

In operation of the accelerograph of FIGS. 1 and 2 itself, the latter may be set up and adjusted so that all components are functioning properly. An externally operated switch 82 may be included in the base or lower half 10 of the housing, the function of which is to prevent the accelerograph from being set in operation by any jarring which might occur during handling of the unit. The cover 12 is then placed over and fitted onto the base 10 and locked by the latching elements 14. The entire accelerograph unit is carried to the location at which it is to be disposed and set down carefully. After waiting for a minute or two for all of the transducer masses to come to an "at rest" position, the switch 82 is gently flipped on so that the battery pack is connected to the trigger relay switch 78. In this status any vertical movement sufficient to set in motion the coil 60' of the seismic trigger results in delivering power to the light source 16 and to the photographic module, thereby producing a recording of shock waves until the preselected period after the last one occurs, at which point the power is cut off. After any shock recording has occurred, the switch 82 may be thrown to its off position, the cover removed and the film removed from the photographic module for examination.

When an accelerograph is of the type which also utilizes the electrical outputs of the coils 60 of the accelerometers 20, 22 and 24, for transmission to a central intelligence center or station 100 in a system illustrated in FIG. 14, the accelerograph and its transmitter should be set up in the same manner as the optical embodiment of FIG. 1. However, after the unit is so set up and the transmitter is beamed toward the station 100 and switched on, desirably it should be purposely jarred to see if it produces a receivable transmission. Whether such a test transmission has been made could be ascertained by telephone communication with the station 100. Periodically thereafter test transmissions should be instituted by similar jarring of each accelerograph-transmitter 106–108 to check the operational availability of each such transmitter in the system. When a quake occurs, all affected units should provide instantaneous information concerning the same to the central intelligence station or center 100 for appropriate relief or other action by the staff assigned to such station or center.

Figure 9:
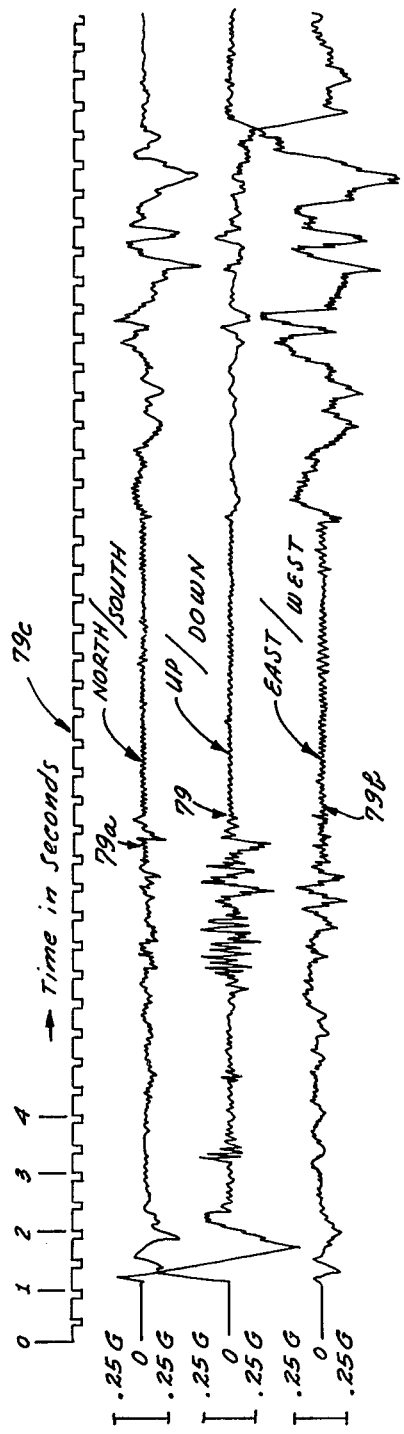
FIG. 9 is an exemplar of traces which typically may be made by the accelerograph of the present invention under earthquake conditions.
Figure 6A:
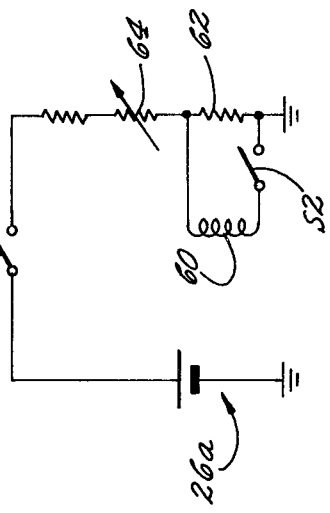

In some applications of the present invention it may be desired to provide a real time reference either optically—similar to the trace 79c shown in FIG. 9—, or through an electrical signal recording run in parallel with, or superimposed upon the voltage variation signal generated through oscillation of a coil 60 or 60" for transmission or recording in the manner heretofore explained. Such a real time reference could be provided by including in an accelerometer unit, a small receiver (not shown) tuned to a time signal station, such as WWVB. Such a receiver could readily be switch on by the seismic trigger 18 of FIG. 1 simultaneously when it actuates a switch 78 in the trigger relay unit 76 to connect the battery 26 to the light source (FIG. 7). The time-indicating output of the receiver could then be utilized to operate a mirror movement similar to what has been disclosed previously in connection with FIG. 9. Alternatively, or concurrently, the time signal coming through as output of the radio receiver could be employed to produce a special voltage variation which could be superimposed upon any recording or transmission of a voltage variation signal generated by oscillation of a coil 60 or 60".

Due to the different damping requirements for an accelerograph coil unit of the type illustrated in FIG. 3, from the requirements for a seismic trigger coil as shown in FIG. 5, it is ordinarily unfeasible to attempt to utilize a seismic trigger coil also to provide any desired generation of recordable electrical signals such as may be produced in a circuit of FIG. 7. Such dual purpose could be accomplished, however, by providing, as shown in FIG. 15, a bandpass filter 120, thereby to manipulate the signals to obtain the desired frequency response as well as the required signal level for starting operation of the apparatus.

I claim:

1. Means to produce electrical voltage variations indicative of the intensities of earth tremors in the area in which said means is disposed, and to transmit said voltage variations to a receiving station for recording and observation, said means comprising:
   a. a battery power source;
   b. a radio frequency transmitter;
   c. first switching means, said first switching means being connectedly interposed between said battery power source and said transmitter, and said first switching means having a first and normally set position whereby the flow of current from said battery power source to said transmitter is interdicted, and a second position to which said first switching means may be temporarily switched whereby such current flow may occur thereby to initiate operation of said transmitter;
   d. a permanent magnet, said magnet providing a magnetic field about a predetermined axis;
   e. a coil of wire, said coil being suspended within said field to oscillate, when jarred, along said axis, and thereby produce a flow of current in said coil;
   f. current responsive relay means, the last said means being connected to opposite terminals of said coil and operatively associated with said first switching means in such manner that when current of a predetermined amperage flows in said coil, said switching means is moved from its first to its second position and retained in the latter position for a predetermined interval after current of such predetermined amperage ceases to flow in said coil;
   g. second switching means, said second switching means being movable from a normally set first position, to a second position;
   h. first resistance element, said first resistance element being normally connected across the opposite terminals of said coil by said second switching means in its first position, to effect electrical damping of oscillations of said coil within said magnetic field until acceleration applied to said coil shall reach a predetermined value, whereupon said first switching means is moved from its first position to its second position;
   i. a second resistance element, said second resistance element being connected across the opposite terminals of said coil by said second switching means when in its second position, said second resistance element being of a different ohm value from the first resistance element, thereby to dampen the oscillation of said coil on a lesser basis than the damping effected by the first resistance element; and j. amplifier integrator means, the input side of said amplifier integrator means being connected across said second resistance element, and the output side of said amplifier integrator means being connected to the input side of said transmitter, thereby to amplify the voltage variations generated in said coil during any oscillation thereof within said magnetic field when the second switching means is in its second position, and to deliver a current with such variations to the transmitter so that radio frequency signals corresponding to said voltage variations may be transmitted by said transmitter to said receiving station.

* * * * *